J. M. BROSIUS.

Assignor of one-half to T. M. JONES.

RUNNING GEAR.

No. 10,922. Reissued Apr. 17, 1888.

WITNESSES:

A. P. Wood.

E. B. Thomas.

INVENTOR:

John M. Brosius.

Albert A. Wood.

Attorney.

N. PETERS, Photo-Lithographer, Washington, D. C.

UNITED STATES PATENT OFFICE.

JOHN M. BROSIUS, OF ATLANTA, GEORGIA, ASSIGNOR OF ONE-HALF TO THOMPSON H. JONES, OF SAME PLACE.

RUNNING-GEAR.

SPECIFICATION forming part of Reissued Letters Patent No. 10,922, dated April 17, 1888.

Original No. 270,382, dated January 9, 1883. Application for reissue filed June 6, 1887. Serial No. 240,463.

*To all whom it may concern:*

Be it known that I, JOHN M. BROSIUS, a citizen of the United States, residing at Atlanta, in the county of Fulton and State of Georgia, have invented a new and useful Improvement in Vehicle-Axles; and I do hereby declare the following to be a full, clear, and exact description of the same, such as will enable others skilled in the art to which it appertains to make and use the same, reference being had to the accompanying drawings, and to letters or figures of reference marked thereon, which form a part of this specification.

My invention relates to vehicle-axles, the object being to so improve them as to make them more easily repairable and adjustable; and it consists of a channel-iron axle-tree having removable and adjustable spindles, the details of which will be fully described hereinafter, and the parts believed to be new pointed out in the claims.

Figure 1:
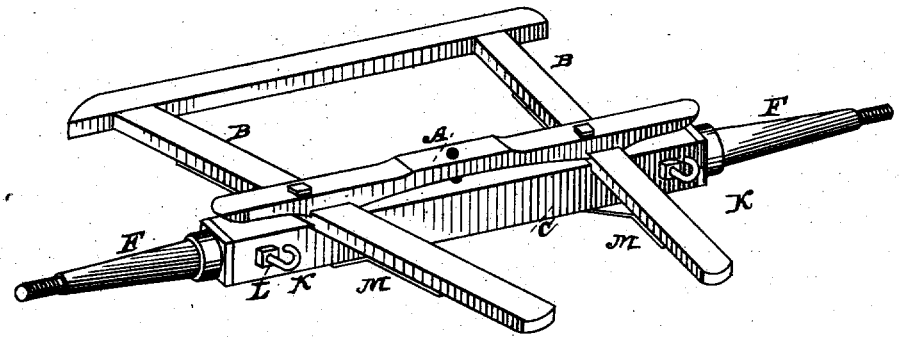
Figure 2:
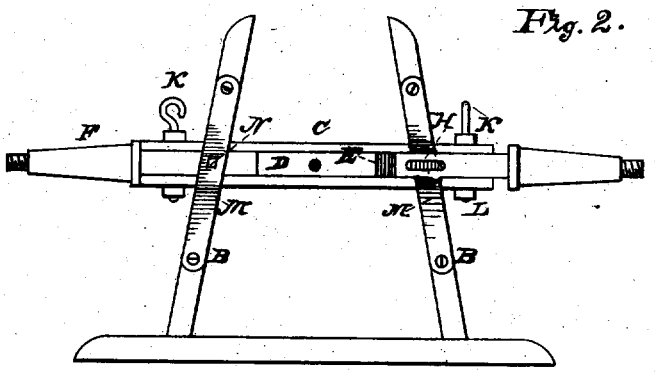
Figure 3:
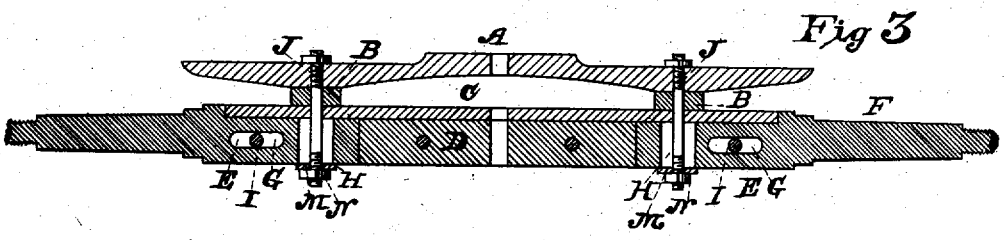
Figure 4:
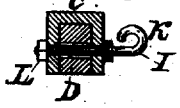
Figure 5:
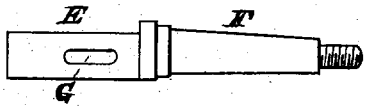

In the accompanying drawings, Figure 1 is a perspective view of a part of the running-gear of a wagon embodying my invention. Fig. 2 is a bottom view of the same. Fig. 3 is a longitudinal vertical sectional view of the axle. Fig. 4 is a cross-section of the same, and Fig. 5 is a detail view.

Similar letters of reference indicate corresponding parts in all the figures.

In the accompanying drawings, A is a bolster, and B the hound, of a wagon, which may be of any desired shape or construction.

C is the axle-tree proper, which is made, preferably, of rolled iron, rolled into a rectangular trough shape, as shown in section in Fig. 4. The middle part of this trough or recess may be filled with a piece of wood or metal, D, fitting into it. In this recess are fitted the slotted ends E of the spindles F, upon which the wheels turn. The inner end, E, of each of the spindles has two holes, G and H, preferably slotted and extending in the direction of the axle, through which the two bolts I and J pass. So far as the attachment of the spindles is concerned the front and rear axles are alike, but the bolts I, which are inserted through the sides of the axle-tree, may, in the front axle, be provided with hooks K in one end for the attachment of the draft-chains, while they are held fast by the nuts L at the other end. The bolts J are inserted vertically through the bolster, the hounds, or other parts of the vehicle, and the axle-tree, and on the under side through two re-enforcing straps, M, fastened to the hounds, and under the axle, and are held fast by the nuts N.

The object in having the inner end of the spindles slotted is to make the axle adjustable to the gage of the track.

It is a well-known fact that when the tire of a wheel has been reset the wheel will be dished more than it was before, and consequently not track with the other wheels or fit in the track where it formerly fitted. To avoid this I draw the spindles as far out on the slot as possible when the wheels are new and secure them by the nutted bolts I and J, and, as the tires wear out or get loose and require resetting I move the spindles in by loosening the nuts on the bolts and tightening them after the spindles are adjusted. In this manner the wheels may be kept at one desired gage of track and may be adjusted in a moment of time.

Having thus described my invention, what I claim as new, and desire to secure by Letters Patent of the United States, is—

1. In a vehicle-axle, the combination of the squarely grooved or recessed axle-tree C, the spindles F, having inner rectangular portions, E, the bolts I, and the bolts J, substantially as described, and for the purpose specified.

2. In an adjustable axle, the combination of the squarely grooved or recessed axle-tree C, the spindles F, having inner square portions, E, having horizontal slots G, and vertical slots H, vertical nutted bolts J, and horizontal nutted bolts I, substantially as and for the purpose shown and set forth.

3. In an adjustable axle, the combination of the squarely grooved or recessed axle-tree C, having central square block, D, the spindles F, having inner square portions, E, having horizontal slots G and vertical slots H, vertical nutted bolts J, and horizontal nutted bolts I, having hooks K, adapted to have draft-chains attached to them, substantially as and for the purpose shown and set forth.

In testimony thereof I hereunto affix my signature in the presence of two witnesses.

J. M. BROSIUS.

Witnesses:

CHAS. H. GIRARDEAU,

E. B. HOOK.